Sept. 3, 1929. W. E. URSCHEL 1,727,020
BEAN HARVESTER
Filed April 15, 1926 12 Sheets-Sheet 5
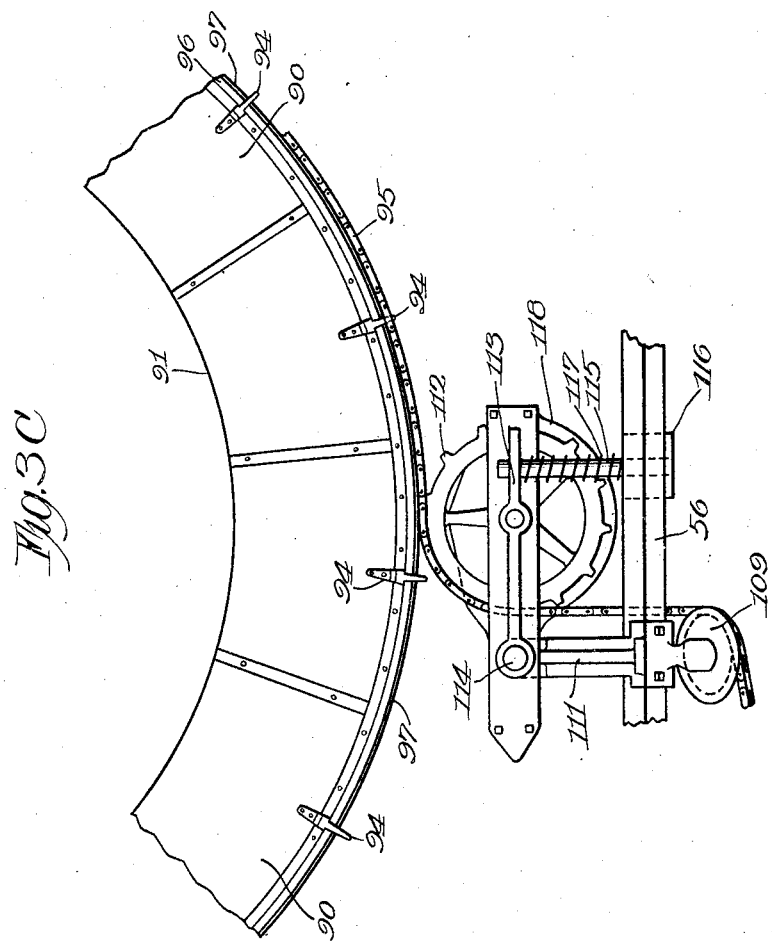
Inventor:
WILLIAM E URSCHEL

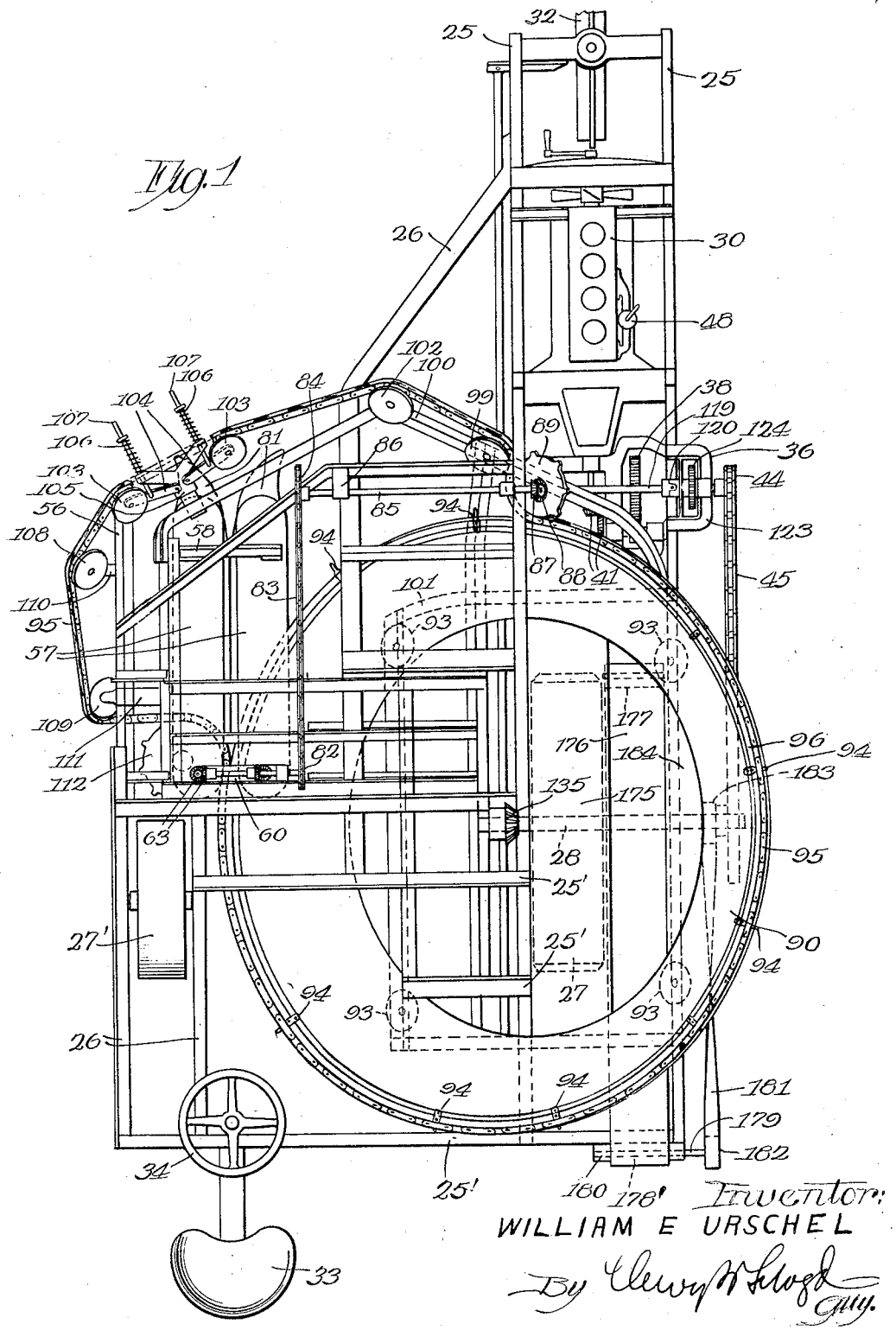

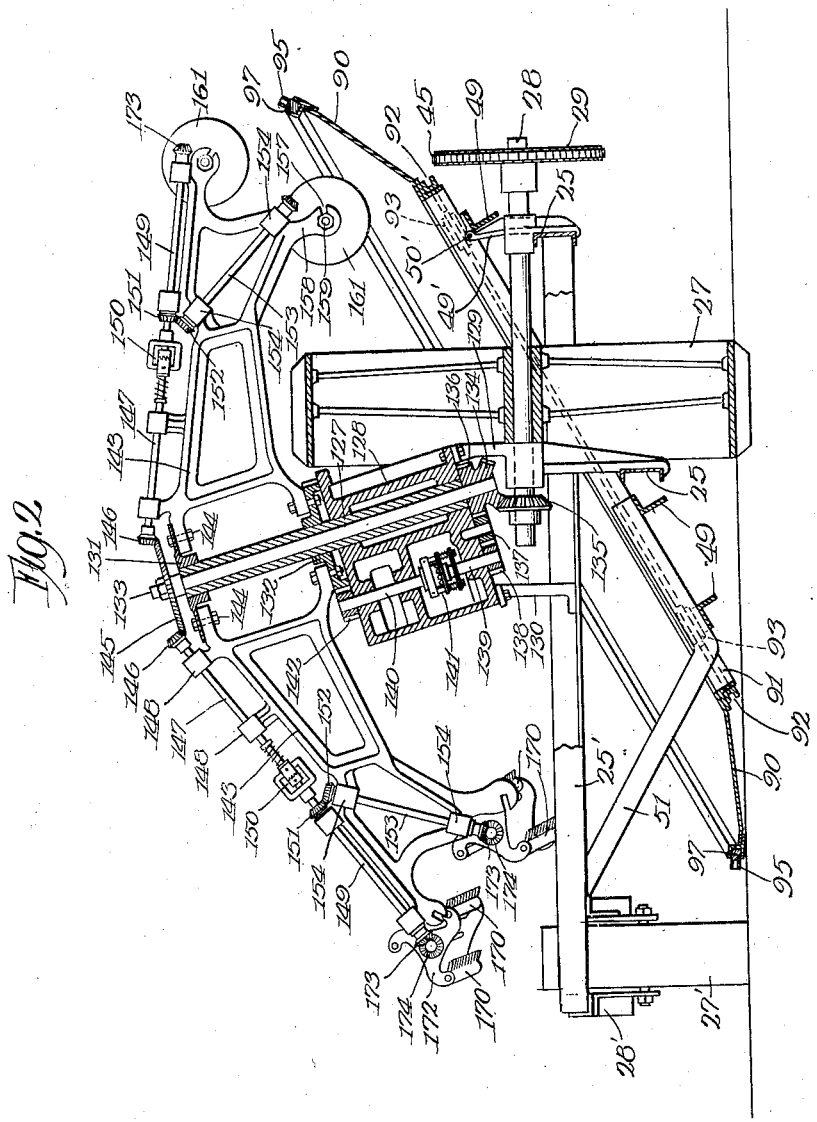

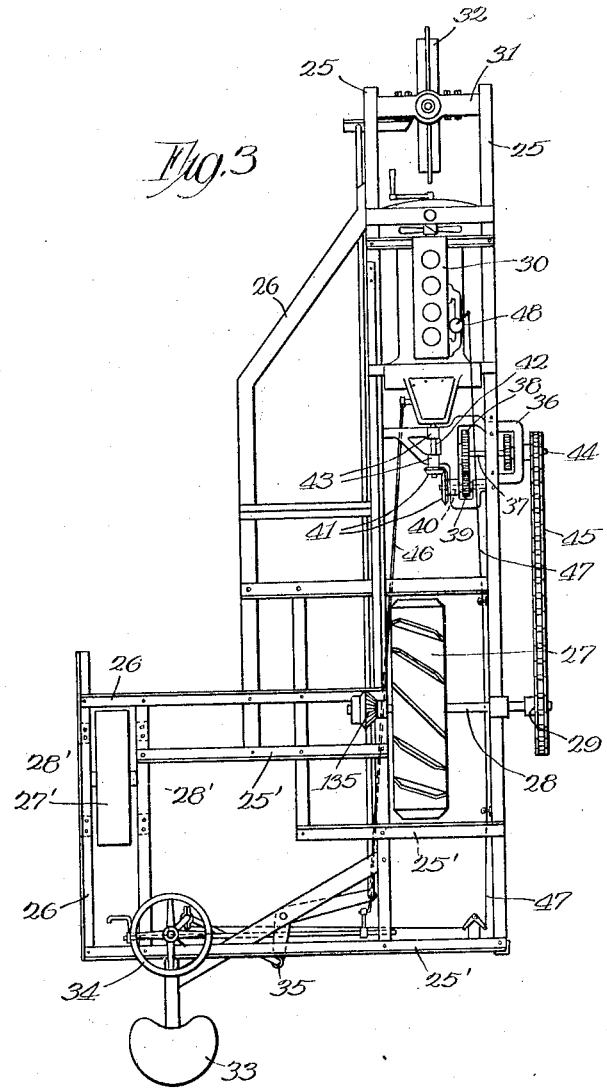

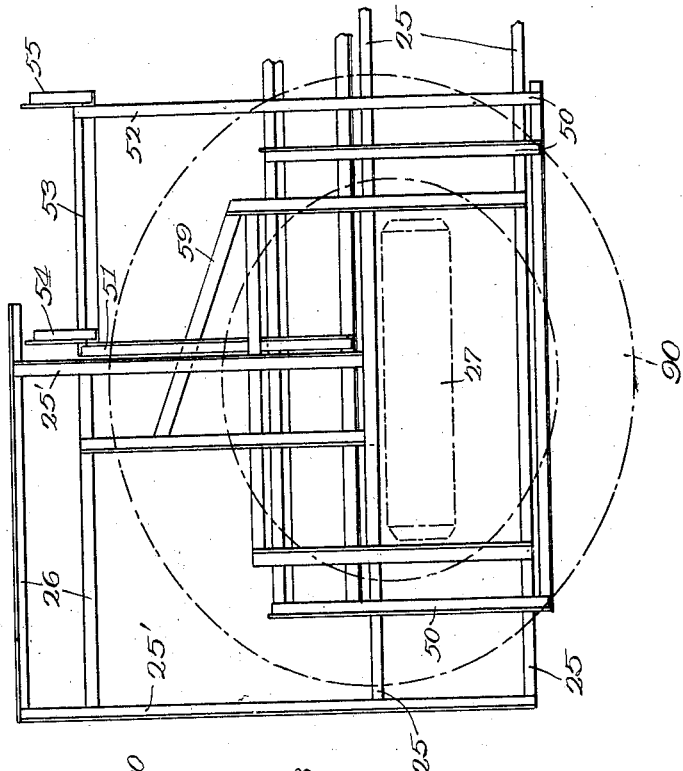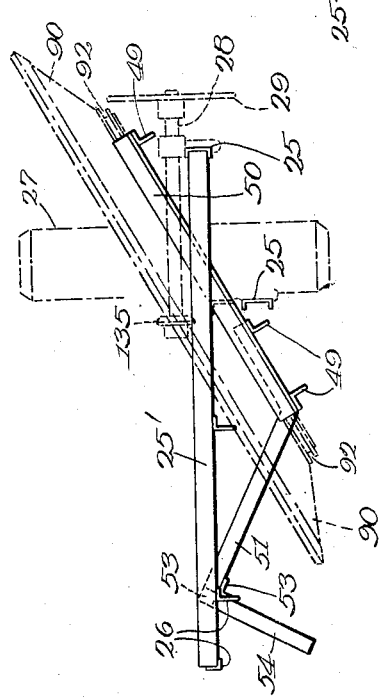

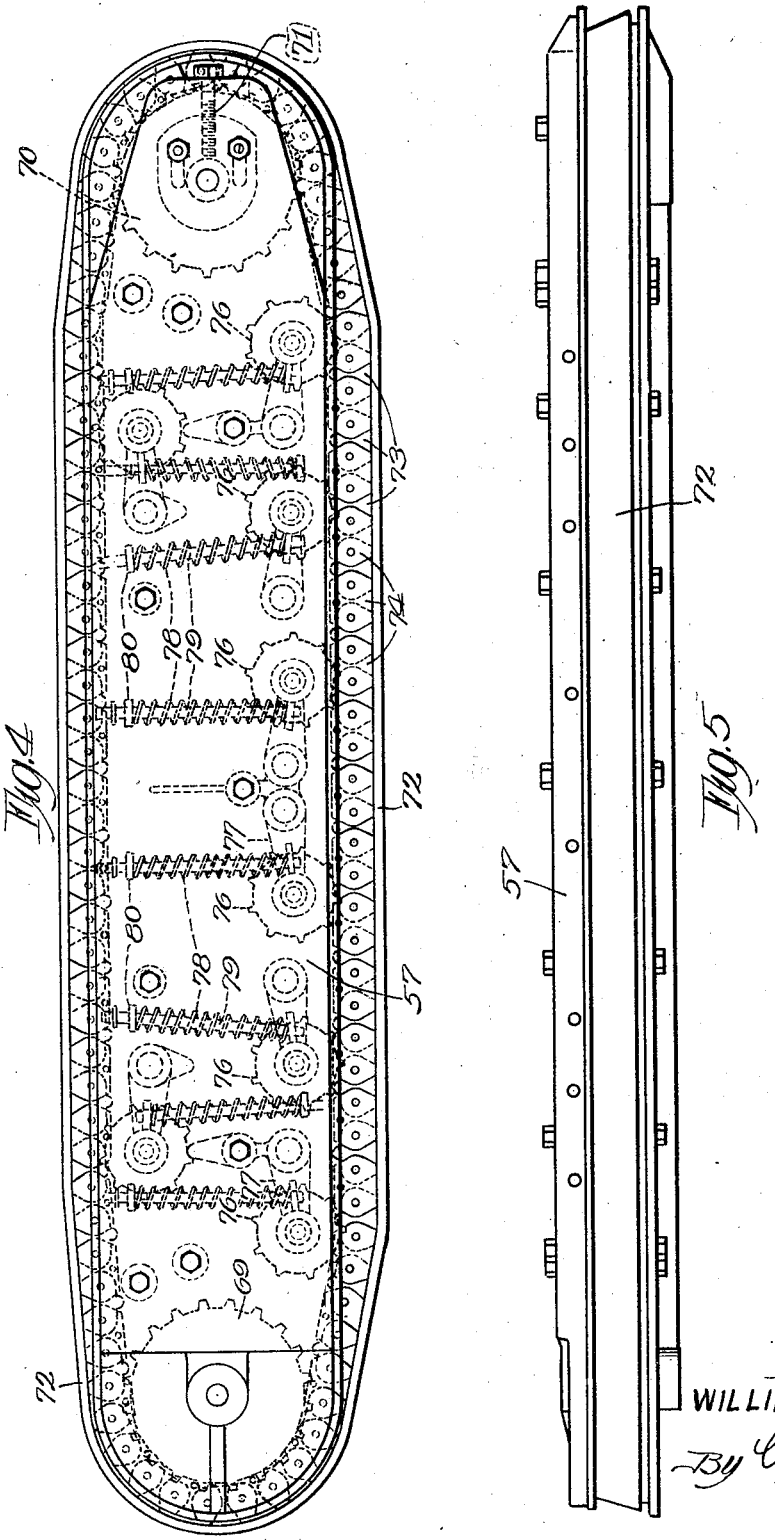

Sept. 3, 1929.                W. E. URSCHEL                1,727,020
                               BEAN HARVESTER
                           Filed April 15, 1926        12 Sheets-Sheet 7
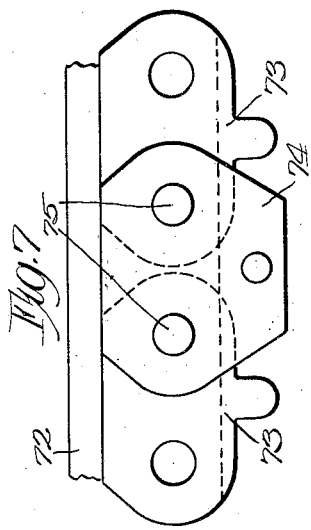
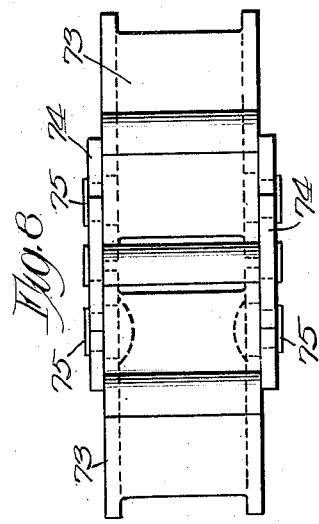
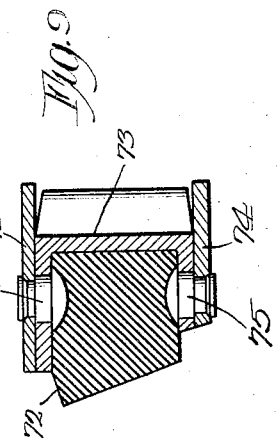
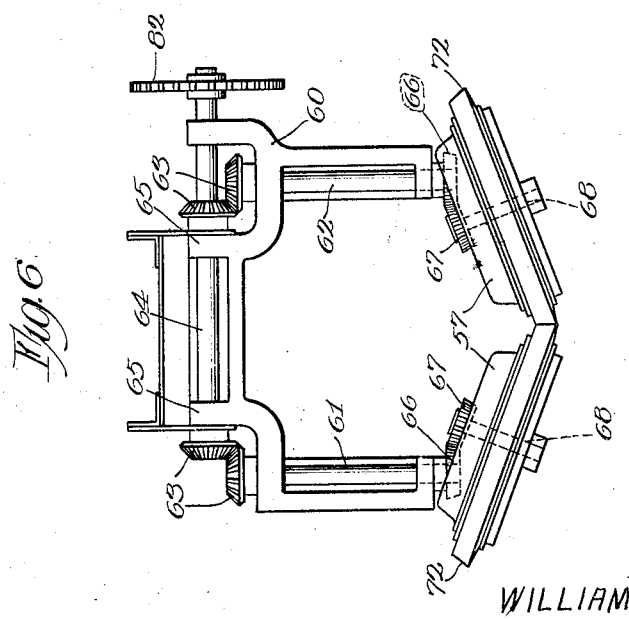
Inventor:
WILLIAM E URSCHEL Sept. 3, 1929.  W. E. URSCHEL  1,727,020
BEAN HARVESTER
Filed April 15, 1926  12 Sheets-Sheet 8
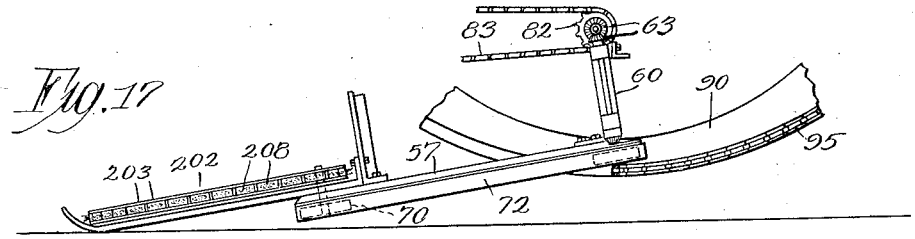
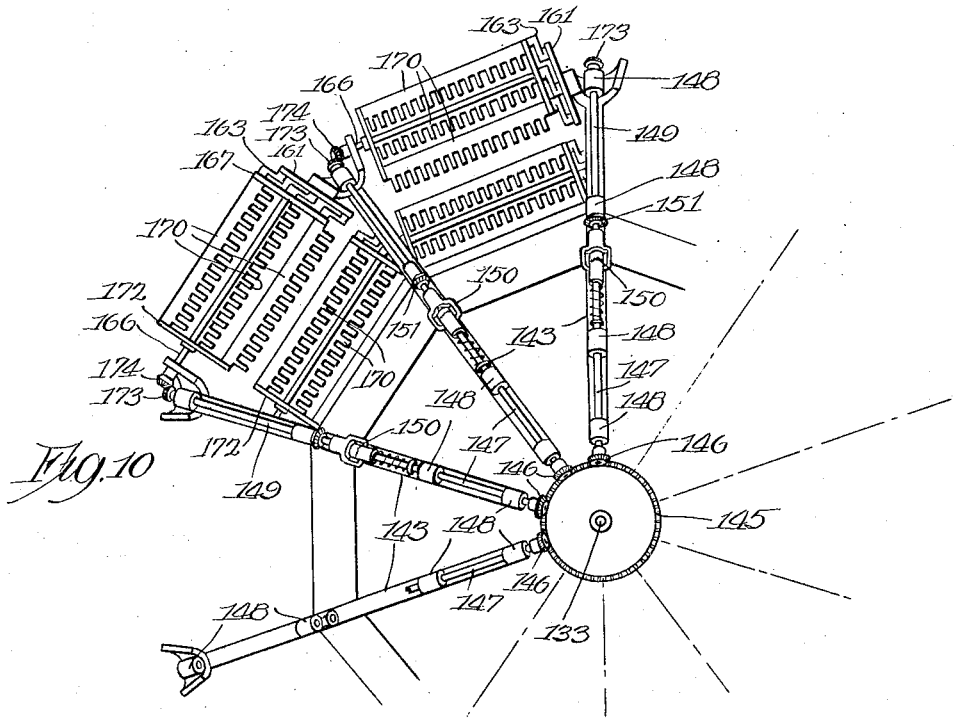
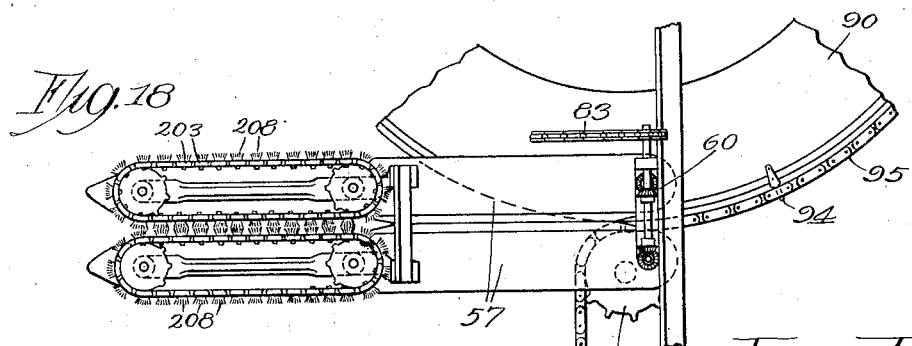
Inventor:
WILLIAM E URSCHEL

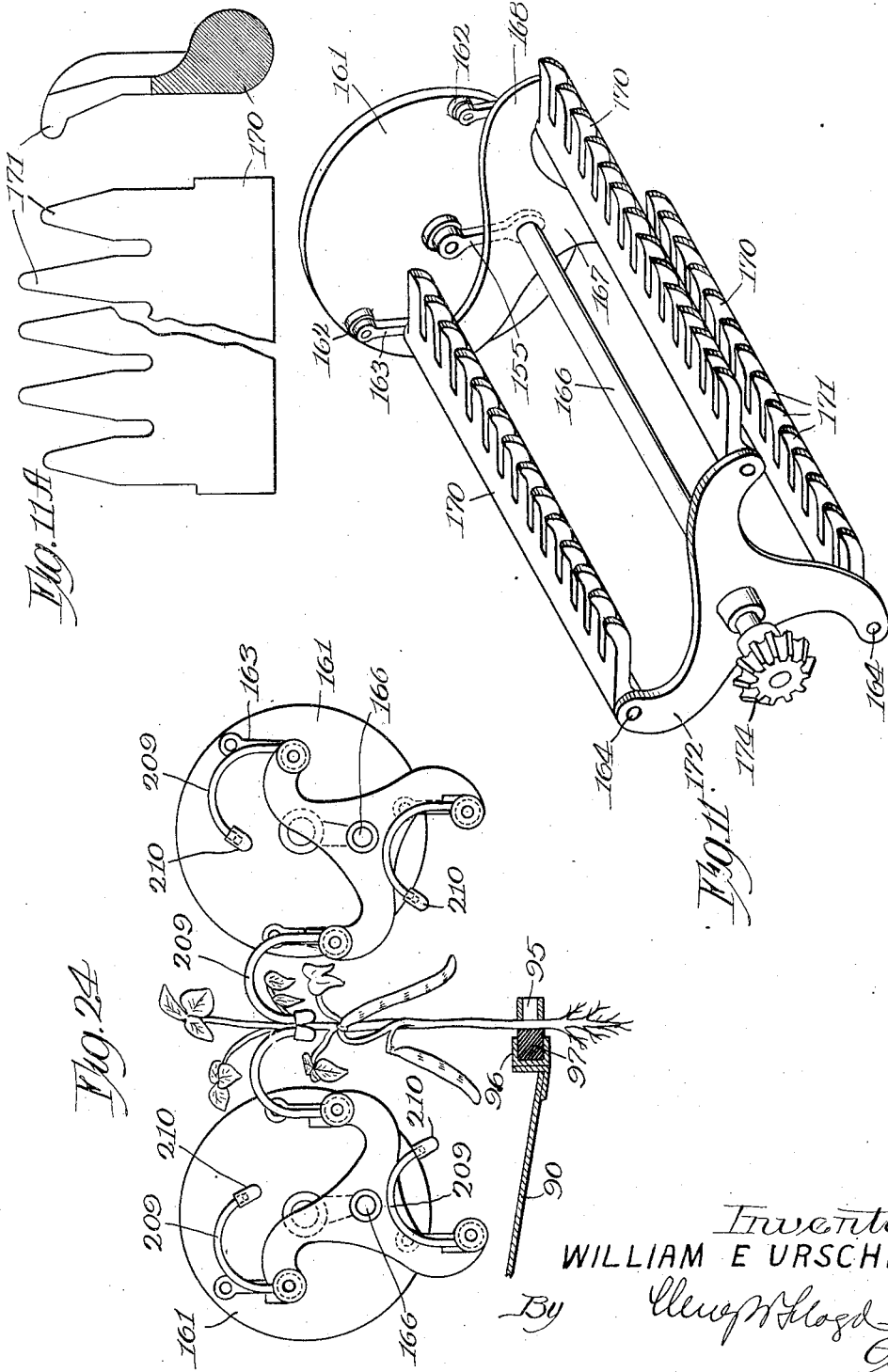

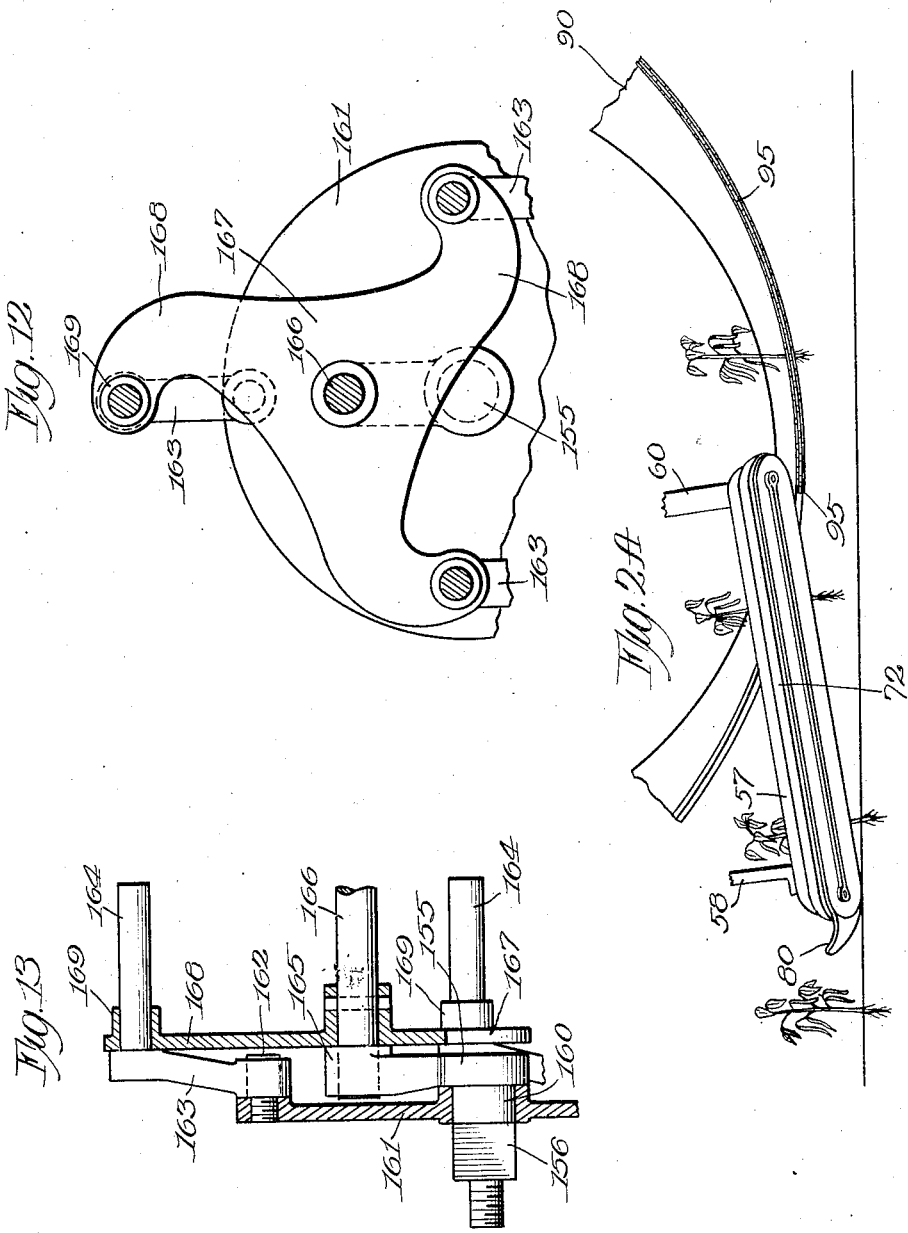

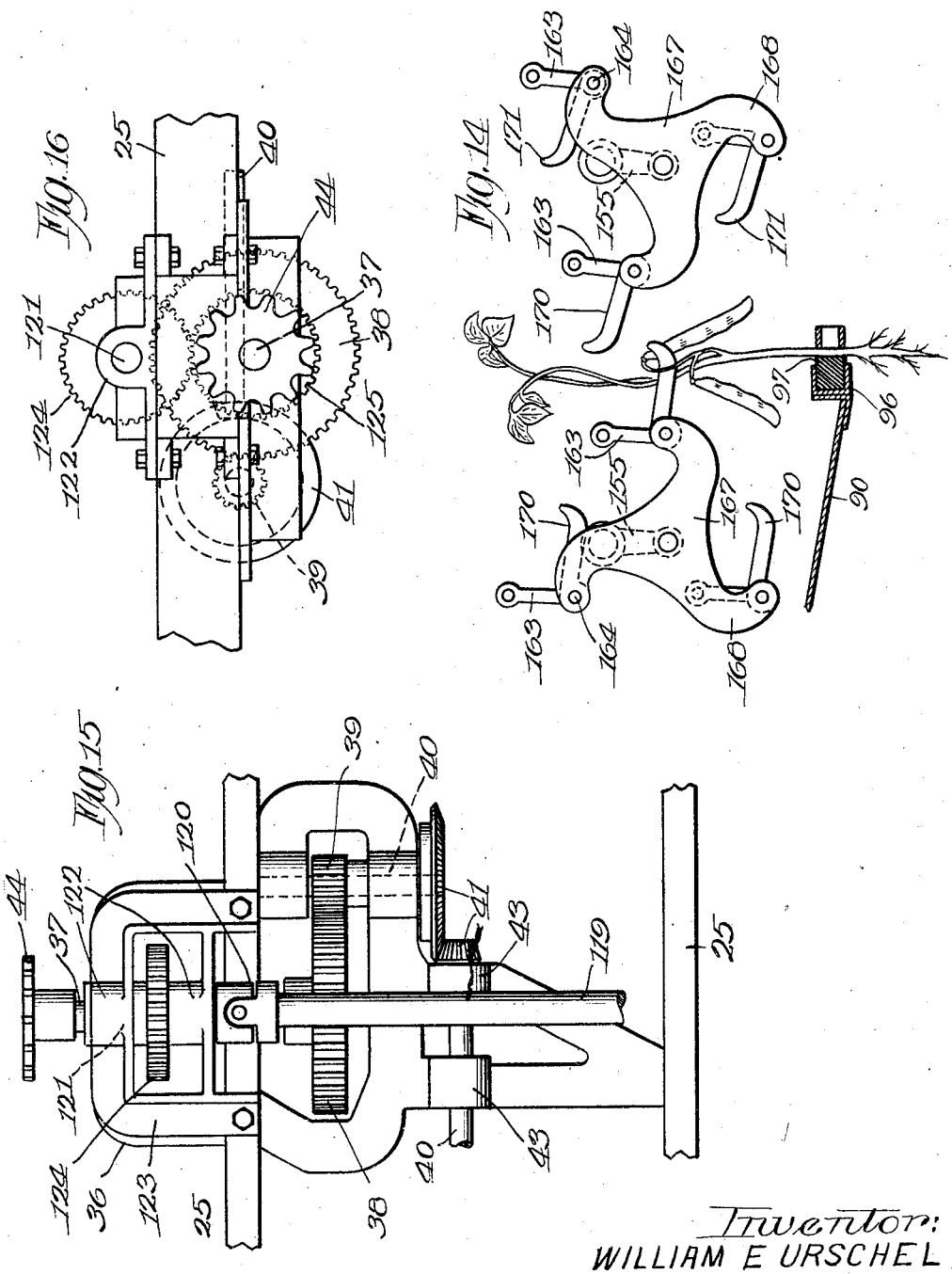

Sept. 3, 1929.  W. E. URSCHEL  1,727,020
BEAN HARVESTER
Filed April 15, 1926   12 Sheets-Sheet 12
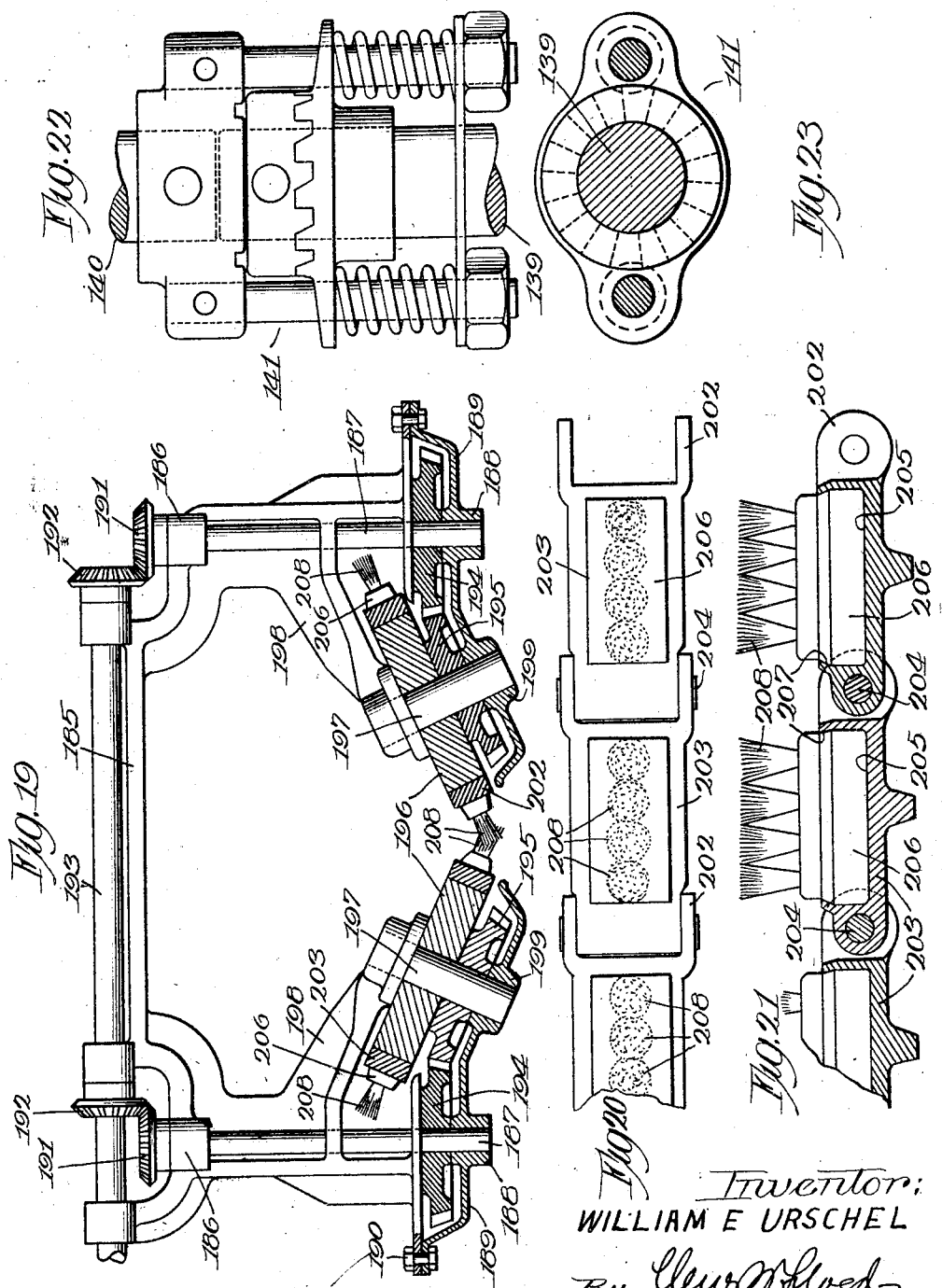
Inventor:
WILLIAM E URSCHEL Patented Sept. 3, 1929.

1,727,020

UNITED STATES PATENT OFFICE.

WILLIAM E. URSCHEL, OF VALPARAISO, INDIANA.

BEAN HARVESTER.

Application filed April 15, 1926. Serial No. 102,113.

This invention relates to a bean harvester. One of the objects of the present invention is to provide an improved form of bean harvester which will pull the bean stalks bodily from the ground and elevate them to a position where the pods will be removed from the stalks and discharged into a suitable receptacle, while the stalks will be discharged onto the ground.

A further object of the invention is to provide a novel and improved means for pulling the bean stalks from the ground in combination with a novel and improved means for gripping and conveying the stalks after they have been pulled from the ground by the pulling mechanism.

A further object of the invention is to provide novel and improved means cooperating with the conveying and gripping mechanism which is adapted to comb or rake the stalks or bushes beginning from the top of the stalk and working gradually down so as to remove the pods therefrom.

A still further object of the invention is to provide an attachment in connection with my improved bean harvester which is adapted to be mounted in advance of the stalk pulling mechanism for lifting the stalk or plant in cases where the plant is in a prostrate position on the ground.

A still further object of the invention is to provide an improved frame construction for a bean harvester in which a secondary frame is pivotally mounted on a main frame construction in such a manner that the mechanism carried by the secondary frame structure which travels in close proximity to the ground may yield upwardly with respect to the main frame when stones or other obstructions are encountered by the machine as it traverses a field.

These and other objects are accomplished by providing a novel construction and arrangement of the various parts in the manner hereinafter described and particularly pointed out in the appended claims.

The machine illustrated in the accompanying drawings is made up of two main units, namely, a unit which pulls the bean stalks from the ground and conveys the stalks to a position where the pickers come into operation to pull the bean pods, and a picker unit which operates on the stalks to pull the beans while the stalks are being conveyed through a predetermined cycle of their movement by the conveying mechanism.

Referring to the drawings:—

Figure 1 is the top plan view of my improved bean harvester showing the construction of the stalk pulling mechanism and the stalk elevating conveying mechanism with the picking mechanism omitted for the purpose of clearness.

Figure 2 is a rear elevational view of my improved bean harvester with certain portions of the pod picking mechanism shown in cross section.

Figure 2$^a$ is a diagrammatic fragmentary side elevational view showing the relative position of the stalk puller with respect to the bean stalk and revolving disk.

Figure 3 is a top plan view showing the main frame construction of my bean harvester.

Figure 3$^a$ is a diagrammatic top plan view showing the relative position of the main frame of the harvester with respect to the secondary frame which supports the elevating disk.

Figure 3$^b$ is a diagrammatic rear elevational view of the main frame of the bean harvester and the secondary frame shown in Figure 3$^a$.

Figure 3$^c$ is a fragmentary top plane view of the revolving disk and chain guiding sprocket.

Figure 4 is an enlarged top plan view of one side of my improved stalk puling mechanism.

Figure 5 is an enlarged side elevational view of the stalk pulling mechanism shown in Figure 4.

Figure 6 is a rear elevational view showing the frame construction of my stalk pulling mechanism and also showing the relative position of the two endless belts for effecting the pulling of the bean stalk or bushes from the ground together with the power connection for operating the same.

Figures 7, 8 and 9 are enlarged top plan, side elevational and cross sectional views respectively of the construction of my stalk puller chain.

Figure 10 is a fragmentary top plan view showing the construction of the picker arms and showing the relative position of the picker fingers with respect to the arms.

Figure 11 is an enlarged perspective view showing the construction of the revolving picker fingers of the eccentric mechanism for maintaining the fingers at the proper angle when they are combing the stalks.

Figure 11ᵃ is an enlarged detail view showing the construction of the pod puller fingers.

Figures 12 and 13 are fragmentary side elevational and cross sectional views respectively of the eccentrically mounted discs for controlling the operation of the picker fingers.

Figure 14 is a fragmentary cross sectional view of a portion of the conveying and supporting disc and chain showing the relative position of the same with respect to the oppositely disposed picker fingers and showing the manner in which the fingers are operated in combing the stalks as they are conveyed and elevated by the revolving disk.

Figure 15 is an enlarged top plan view of the transmission for my improved bean harvester.

Figure 16 is a side elevational view of the transmission shown in Figure 15.

Figure 17 is a side elevational view of my stalk lifting attachment showing the manner in which it is mounted on the stalk puller and its relative position with respect to the chain and disk elevator mechanism.

Figure 18 is a top plan view of the stalk lifting mechanism shown in Figure 17.

Figure 19 is a rear elevational view partly in cross section showing the relative position of the oppositely disposed endless stalk lifting chains and the manner in which the same are supported and operably driven.

Figures 20 and 21 are enlarged top plan and cross sectional views respectively of my improved form of stalk lifting chain.

Figure 22 is an enlarged side elevational view of the slip clutch mechanism for the picker drive shafts.

Figure 23 is an enlarged and elevational view showing a portion of one of the clutch members, and Figure 24 is a side elevational view showing a modification of the construction of the pod puller or picking mechanism shown in Figure 14.

Main frame construction.

The main frame of my improved bean harvester illustrated in the drawings comprises two longitudinally extending main frame members 25 and supplemental longitudinally extending main frame members 26. These main frame members are secured together by suitable transverse frame members 25'.

Mounted between the two main frame members 25 adjacent the rear end for supporting the frame of the harvester is a main or bull wheel 27 which is keyed to a main shaft 28. The main shaft 28 is rotatably mounted in suitable bearings (not shown) secured to the main frame members 25. The outer end of the shaft 28 has secured thereto a driven sprocket 29. Positioned opposite the main drive wheel 27 for supporting the left side of the harvester is a relatively small supporting wheel 27' which is journalled in suitable brackets 28' secured to the supplemental main frame members 26.

Mounted in the forward end of the harvester and between the longitudinally extending main frame members 25 is a conventional form of internal combustion engine 30 which forms the source of power for the harvester.

Mounted forwardly of the internal combustion engine 30 by means of a suitable supporting bracket 31 which is secured to the longitudinally extending main frame members 25, is a guiding wheel 32. The guiding wheel 32 is controlled from the operator's seat 33 which is secured to the rearmost transverse member 25' by means of an operator's steering-wheel 34 which is provided with suitable connections as shown at 35 for controlling the angularity of the guiding wheel 32.

Transmission mechanism.

Mounted substantially midway between the ends of the longitudinally extending main frame members 25 and adjacent the clutch mechanism of the internal combustion engine 30 by means of securing bolts, is a transmission bracket 36. (See Figures 3, 15, and 16.)

Mounted transversely in suitable bearings in the transmission bracket 36 is a shaft 37. The shaft 37 is provided adjacent one end thereof with a gear 38. The gear 38 is operably driven by a pinion 39 which in turn is secured to a shaft 40 mounted in suitable bearings in the transmission bracket 36.

The shaft 40 is operably driven by means of two gears 41, one of which is secured to the shaft 40 and the other of which is secured to the clutch shaft 42 of the internal combustion engine 30. The shaft 42 is mounted in suitable bearings 43 in the transmission bracket 36. The outer end of the shaft 37 is provided with a drive sprocket 44 which is geared to the sprocket 29 by means of a drive chain 45.

Suitable connections such as shown at 46 extend from the clutch mechanism of the internal combustion engine to the seat 33 of the operator so that the power may readily be connected or disconnected at the will of the operator and suitable connections such as shown at 47 extend from the carburetor 48 of the engine back to the seat 33 of the operator so that the speed of the internal combustion engine may be controlled by the operator.

From the above description it will be readily understood that by reason of the controlling mechanism together with the transmission mechanism which operably connects the internal combustion engine with the traction wheel of the harvester the propulsion of the harvester over the field may readily be controlled from the seat of the operator.

Secondary frame.

Mounted at an angle of substantially 30 degrees with respect to the horizontal and supported by the horizontal main frame members shown in Figure 3, is a secondary frame construction which comprises three longitudinally extending angle members 49 and three transversely extending angle members 50. (See Figures 3ª and 3ᵇ.)

The secondary frame is supported on the main frame of the harvester by standard 49' which is secured to the main frame member 52 at its lower end. The upper end of the standard 49' forms a pivotal connection as shown at 50' between the secondary frame and the main frame so that the secondary frame may be raised or lifted from the ground to prevent damage to the frame and disk in the event stones or other obstructions are encountered as the machine traverses the field.

The secondary frame is provided, adjacent its forward end, with two laterally and upwardly extending members 51 and 52. The member 52 is formed by extending the forward end of the forward member 50 laterally with respect to the secondary frame.

Secured to the outer end of the members 51 and 52 is a longitudinally extending angle member 53. Secured to the member 53 and extending downwardly at an angle as shown in Figure 3ᵇ are two angle members 54 and 55.

Stalk pulling mechanism.

Secured to the downwardly extending angle members 54 and 55 is a longitudinally extending member 56. Mounted beneath the transverse members 51 and 52 and extending longitudinally of the harvester are two oppositely disposed stalk puller frames 57. The stalk puller frames 57 are held in spaced relation by an arch bracket 58 at their forward end which in turn is supported by an angularly disposed bar 59 which has one portion thereof secured to one of the main frame members 25 and supplemental main frame members 26, and the other end thereof secured to the longitudinally extending members 53 and 56.

The rear end of the oppositely disposed stalk pulling frames 57 is supported by an arch bracket 60 which forms the bearing for two vertically disposed shafts 61 and 62 which in turn are operably driven by means of gears 63 and horizontally disposed shaft 64.

The shaft 64 is mounted in suitably spaced apart bearings 65 formed in the arch bracket 60. The lower ends of the vertical shafts 60 are provided with gears 66 which in turn mesh with and operably drive gears 67. Gears 67 are secured to shaft 68 which in turn are secured to and operably drive the sprockets 69 mounted in the rear end of the puller frames 67.

The forward end of the puller frames 57 are provided with idler sprockets 70 which are adjustable by means of a threaded bolt 71 which is in threaded engagement with the bearings in which the sprockets 70 are mounted for varying the tension of the endless belts which are trained about the sprockets 69 and 70.

One of the important features in connection with my improved form of stalk pulling mechanism is the provision of positioning these pulling endless belts at an angle with respect to each other as is clearly shown in Figure 6. By thus arranging these endless belts at this angle I am able to grip the stalk at a position on the plant in close proximity to the ground, thereby insuring a positive grip which will enable the easy withdrawal of the stalks on the ground.

In the construction of my improved form of stalk pulling chain, I find it extremely important to employ a yielding material or substance such as rubber as indicated at 72 which I preferably mount in a shell-like link 73. The links 73 are operably connected to the adjacent links by connecting links 74 and rivets 75. These stalk pulling links provided with rubber stalk engaging surfaces are normally pressed outwardly with respect to the puller engaging frame 57 by a plurality of spring pressed idler sprockets 76 which are rotatably journalled on pivoted arms 77.

The arms 77 are normally pressed outwardly by compression springs 78 which are mounted on reciprocable rods 79 which in turn have one end connected adjacent the free end of the arm 77 and the other end reciprocally mounted in brackets 80 in such a manner that the springs exert a resilient tension to force the idler sprockets outwardly so as to provide a resilient gripping tension for impinging and gripping the bean stalks in a firm manner while they are being pulled from the ground.

The forward end of each of the puller frames 57 are provided with outwardly curved guards 81 for guarding and guiding these frames over the rows of stalks. This pulling mechanism is operably driven by a sprocket 82 which is secured to one end of the shaft 64 and geared by means of a chain 83 to a sprocket 84.

The sprocket 84 is mounted on a transverse shaft 85 which is rotatably mounted in suitable bearings 86, one of which is secured to the bar 59 and the other of which is secured to the longitudinally extending frame member 25. Mounted on the end of the shaft 85 opposite the end on which the sprocket 84 is mounted, is a bevel gear 87 which is in mesh with and operably driven by the gear 88. The gear 88 may be formed integrally with the sprocket 89.

From the above it will be seen that as my improved bean harvester is propelled through the field so that the puller frame, with the two endless belts passing on the opposite sides of a row of stalks, the resilient rubber surface chains will impinge the stalks adjacent the ground and that by reason of the inclination of the puller frame as shown in Figure 2, the stalks will be withdrawn from the ground as the harvester is moved forwardly over the row.

*The stalk elevating and holding mechanism.*

The stalk pulling mechanism is so arranged that the inner laps of the conveying chains of the lifting mechanism are positioned above and in longitudinal alignment with one edge of the periphery of my improved stalk elevating disk and associated mechanisms.

This stalk elevating and holding mechanism comprises a revolving disk 90 which is preferably in the form of a dish with the center or bottom portion left out as shown at 91. This revolving disk 90 is provided on its lower and inner edge with an annular channel shaped member 92 which forms the mounting for rotatably supporting disk 90 on four spaced apart rollers 93 which are journalled on suitable bearings secured to the secondary frame of the machine.

These rollers 93 are so arranged to engage the annular groove is in the channel member 92 in such a manner as to prevent displacement of the disk 90 from the secondary frame.

The disk 90 is provided with a plurality of spaced apart projections 94 which are adapted to engage certain of the links of the conveying and elevating chain 95 which extends around the periphery of the disk 90 from a position adjacent the pulling mechanism to a position adjacent the forward peripheral edge of the disk 90.

The disk is so positioned or inclined by reason of its mounting on the secondary frame that one edge thereof is in close proximity to the ground adjacent the stalk pulling mechanism so that the lower side of the stalk is gripped between the periphery of the disk and the conveying chain 95 after it has been pulled out of the ground by the stalk lifting mechanism.

The outer edge or periphery of the disk 90 is provided with a channel member 96 with the annular channel thereof extending outwardly from the direction of the center of the disk. Mounted within the annular channel of the member 96 and secured thereto in any well known manner is a live rubber member 97 which is preferably square in cross section as clearly shown in Figures 2a and 14.

The forward portion of the chain 95 is deflected from its course around the periphery of the disk 90 at a position 98 by means of the sprocket wheel 89. From this point the chain is deflected forwardly then laterally by an idler sprocket 99 which is journalled on a supplemental frame member 100 which in turn has its opposite ends as shown at 101 and 102 secured to the secondary frame.

The forward end of the chain 95 is trained about a second idler roller 102 which is journalled on the frame member 100 at a position slightly forwardly and laterally of the idler sprocket 99.

From this point the chain 95 is deflected at an angle slightly rearwardly and is trained about two coacting chain tightening sprockets 103 which are journalled on two oppositely disposed pivoted arms 104 which in turn are pivoted to a bracket 105 which is secured to the frame member 100. The two chain tightening sprockets 103 are normally pressed outwardly in a manner to take out the looseness in the chain by two compression springs 106 which are adjustably mounted on hook bolts 107.

The chain 95 after leaving the rearmost chain tightener sprocket 103 is deflected rearwardly and outwardly and slightly downwardly about two idler sprockets 108 and 109.

The sprockets 108 and 109 are journalled on laterally extending arms 110 and 111 respectively which in turn are secured to frame member 56. After the chain leaves the idler sprocket 109, it is deflected inwardly so as to travel substantially on a line transverse to the longitudinal center of the machine and is guided onto the periphery of the disk 90 by means of a guiding sprocket 112.

The guiding sprocket 112 is journalled on an arm 113 which has one end thereof pivoted to a pin 114 and the free end thereof, which extends beyond the center of the sprocket 112, adapted to receive a pin 115 extended through an aperture in the free end of the arm. The pin 115 is secured to a bracket 116 which in turn is secured to the frame member 56. Mounted between the bracket 116 and the free end of the arm 113 is a compression spring 117 which normally presses the arm 113 inwardly so as to force the guiding sprocket 112 against the periphery or edge of the rotating disk 90.

The guiding sprocket 112 is provided with a shield 118 on the lower side thereof so as to prevent any obstructions, for instance, such as stones or dirt, from interfering with the operation of the guiding wheel sprocket. The idler sprockets 102, 108, 109 and chain tightener sprockets 103 are arranged with respect to the revolving disk so as to raise and elevate the chain adjacent the forward part of the bean harvester whereby the chain will readily pass over the tops of the stalks when the machine is traveling up the row of bean stalks as clearly shown in Figure 2.

The conveying chain 95 and revolving disk 90 are operably driven by the driving sprocket 89 which in turn derives its power from a tumbling shaft 119 which is provided with a universal knuckle 120. Extending from the universal knuckle 120 is a stub shaft 121 which is mounted in suitable bearings 122 formed in a bracket 123 secured to the upper side of the outside frame member 25 as clearly shown in Figures 15 and 16.

Secured to the stub shaft 121 is a gear 124 which is in mesh with a gear 125. The gear 125 is secured to the shaft 37.

From the above description it will be seen that when the clutch mechanism is thrown into operation by the operator on the seat that the power operative connections as above described will operably drive the conveyor chain 95 and thereby rotate the disk 90 so that the stalks will be gripped between the chain 95 and the periphery of the disk and elevated to a position where my improved pod picking mechanism will come into action for picking the pods from the stalks as clearly shown in Figure 2.

*Pod puller or picking mechanism.*

The inner end of the main or bull wheel shaft 28 is mounted in a main bearing bracket 126 which in turn is secured to one of the inner main frame members 25. Mounted at an angle with respect to the axis of rotation of the revolving disk 90 is a tubular shaft 127. The tubular shaft 127 is journalled within a casing 128 which in turn is secured to an upwardly extending ear 129 formed integrally with the main frame bearing bracket 126.

This ear 129 forms a support for one side of the casing 128 and the other side of the casing is supported by an arm 130 secured to the main frame of the machine. Adjacent the upper end of the tubular shaft 127 is a disk or plate 131. Secured to the tubular shaft 127 intermediate its ends and adjacent the upper side of the casing 128 is a gear 132. Rotatably mounted within the tubular shaft 127 is a picker finger drive shaft 133. The picker finger drive shaft has secured adjacent its lower end a beveled gear 134 which is in mesh with a beveled gear 135 secured to the bull wheel shaft 28.

Formed integrally with the beveled gear 134 is a spur gear 136 which in turn meshes with and drives an idler gear 137. The idler gear 137 meshes with and drives a gear 138. The gear 138 is secured to a stub shaft 139 rotatably mounted in suitable bearings in the casing 128.

Mounted coaxially with and driven by the stub shaft 138 and journalled in suitable bearings in the casing 128 is a second stub shaft 140. Disposed between the stub shafts 139 and 140 is a frictional slip clutch mechanism 141 which permits the slipping of these shafts with respect to each other in the event any foreign matter should clog in the operating mechanism and thereby prevent the breaking of any of the operative parts of the machine.

Secured to the upper stub shaft 140 is a gear 142 which is in mesh with the gear 132 secured to the tubular shaft 127. Secured to the gear 132 and the plate 131 are a plurality of laterally extending picker arms 143. These picker arms are secured to the gear 132 and the plate 131 by means of bolts 144. These arms 143 extend radially outwardly from the tubular shaft 127 by which they are revolved and I preferably provide ten of these arms in number.

From the above description it will be noted that as the machine is moved forwardly and the beveled gear 135 is revolved by the bull wheel shaft 128, the beveled gear 134 will be driven, thereby rotating the spur gear 106 formed integrally with the gear 134. Through the idler gear 137 which meshes with the gear 138, the stub shafts 139 and 140 will be driven. By reason of the gear 142 meshing with the gear 132, the tubular shaft will be revolved carrying with it the revolving picker arms 143.

Secured to the upper end of the shaft 133 is a beveled gear 145 which meshes with and operably drives a beveled pinion 146. The beveled pinion 146 is secured to the upper end of the shaft 147 which in turn is journalled in suitable bearings 148 in each of the picker arms 143.

Mounted coaxially with the shafts 147 and journalled in suitable bearings 148 formed in the picker arms 143, are second shafts 149. Positioned between the shafts 149 and 147 are spring press slip clutches 150. The slip clutches 150 permit the rotation of the shafts 147 with respect to the shafts 149 in the event the picker fingers become clogged and thereby prevent the breakage of any of the parts.

Secured to the upper ends of the shafts 149 adjacent one of the bearings 148 are beveled pinions 151 which mesh with and operably drive beveled pinions 152 which latter are secured to shafts 153 mounted in suitable bearings 154 formed in the arms 143. The shafts 153 are disposed at an angle with respect to the shafts 149 so that the lower ends thereof are spaced at sufficient distance to permit the mounting of my improved construction of rotatable picker finger mechanism so as to provide ample space between the revolving picking mechanisms which are adapted to operate on the opposite sides of the bean stalks.

My improved pod picking mechanism comprises two oppositely disposed revolving heads and comprises nonrotatable fixed cranks 155 which are preferably provided with flattened end portions as shown at 156, (Figure 13), which are adapted to be received in slots 157 formed in the downwardly projecting arms 158 formed integrally with the picker arms 143. The cranks 155 originally secured to the arms 158 by means of nuts 159 rotatably mounted on the cylindrical portions 160 of the cranks 155 are revolving disks 161.

Each of the disks 161 are provided with three spaced apart studs 162 of which there are preferably three in number to each rotating head. The studs 162 pivotally receive the crank portions 163 of the picker finger supporting shafts 164.

Journaled in the offset bearings 165 formed on the outer ends of the cranks 155 are spider shafts 166. Secured to the spider shafts 166 adjacent the cranks 155 are revolving eccentrically mounted spiders 167.

The spiders 167 have three laterally offset arms as shown at 168 which are provided with bearings 169 which in turn receive and rotatably secure therein the finger shafts 164. Mounted on the finger shafts 164 and secured thereto in any well known manner are a plurality of pod picker fingers 170.

These picker fingers 170 are preferably provided with upwardly extending pointed ends 171 which particularly adapt them for pulling the pods from the stalks while the revolving heads are combing the stalks. The other ends of the picker heads are provided with revolving spiders 172 similar in construction to the spiders 167.

The picker heads are driven by the shafts 149 and 153 which are provided at their lower ends with beveled pinions 173 which mesh with and operably drive beveled pinions 174 secured to the spider shafts 166. These pod picking fingers are secured to the finger shaft 164 in a position where they most effectively comb the bean stalks to remove the bean pods therefrom or in other words are positioned so that they are maintained in the position shown in Figure 14 as they are passing through the bean stalks and by reason of the eccentric crank construction they are always maintained in the position shown in this figure.

From the above it will of course be understood that as the beveled gear 135 secured to the main shaft 28 is revolved, the beveled gear 134 drives the shaft 133 which in turn drives the beveled gear 145 secured to the upper end of the shaft.

The beveled gears 145 mesh with the pinions 146 which in turn drive the shafts 147 and 149 together with the shafts 153 which are operably driven by reason of the meshing gears 151 and 152. The shafts 149 and 153 operably drive the revolving picker heads by reason of the beveled gears 173 and 174.

In the operation of the above described device it will of course be understood that as the arms 143 are being revolved about the tubular shaft 127 as their axis, the revolving heads will likewise be driven so that the pod picking fingers revolve toward one another in a manner to lift the pods upwardly between the revolving picker heads, and it will also of course be understood that the revolving picker arms are so timed with respect to the revolving movement of the elevating and conveying disk 90 that the disk travels at a relatively slower speed than the picker arms revolve, and that by reason of the angular position of the axis of the picker arms with respect to the axis of the revolving disk, the picker heads will begin to comb the tops of the stalks and gradually work down until all the pods are picked from the stalks.

It will also be noted that by reason of the revolving picker arms traveling at a relatively faster speed than the revolving disk, the revolving picker heads will continually change their position with respect to the position of the stalks traveling on the elevating and conveying disk, thus insuring complete combing of the stalks from the top thereof to the bottom by the picker fingers of the picker heads.

Extending over the bull wheel 27 from a position substantially through the diameter of the aperture 91 in the center of the disk 93 is a guard or shield 175. This shield or guard is secured by suitable means to the main frame and is arranged to deflect the pods onto an endless belt 176 which is trained about an idler roller 177 and operably driven by a drive roller 178. The roller 178 is secured to a shaft 178' which is mounted in bearings 180 which in turn are secured to the main frame of the machine.

The shaft 178' is operably driven by the endless belt 181 which is trained about a pulley 182 and is secured to the shaft 178' and on the pulley 183 secured to the main drive shaft 28 of the harvester. Positioned on the side of the endless conveyor belt 176 opposite the guard 175 is a second guard or shield 184 which extends from the inner circular edge of the disk 90 to adjacent one side of the endless conveyor belt 176 and serves to deflect the bean pods being picked from the stalk onto the conveyor belt. The upper lap conveyor belt 176 of course being driven in a rearwardly direction conveys the pods to the rear of the machine into a suitable receptacle which may be attached to the machine.

Stalk lifting attachment.

In connection with my improved harvester I have provided a special attachment in the way of a stalk lifting device which may be attached in advance of the stalk pulling mechanism and is to be used in connection with my bean harvester when unusual conditions in a field are encountered, such for instance as when the stalks are lying prostrate or substantially prostrate on the ground.

This attachment comprises an arched frame 185 which is secured in any well known manner to the forward end of the lifting frame members 57 and 59. This arch frame member 185 is provided with suitable oppositely disposed bearings 186. Journalled in the bearings 186 are two downwardly extending shafts 187.

The lower end of the shafts 187 are supported in bearings 188 formed in the shield brackets 189 which have one end thereof secured to the arch bracket 185 by bolts 190. The upper end of the shafts 187 are provided with beveled gears 191 which in turn mesh with and are operably driven by gears 192.

The gears 192 are secured to a transfer shaft 193. The lower ends of the shafts 187 are provided with beveled gears 194 which mesh with beveled gears 195. The gears 195 are formed integrally with sprockets 196. The sprockets 196 and the gears 195 are journalled on stub shafts 197 which are secured to the bearing portions 197 formed on inwardly extending arms 198 formed integrally with the arch member 185.

The lower end of the stub shafts 197 are secured to the bosses 199 formed on the lower side of the shield brackets 189. The sprockets 196 positioned on the opposite sides of the arch member 185 are arranged at an angle with respect to the horizontal so that their inner edges are arranged in close proximity to each other.

Secured to the arch member 185 and guard brackets 189 extending forwardly therefrom are suitable frame members 200. Mounted on the forward end of the frame members 200 on suitable journals are two oppositely disposed and angularly arranged sprockets 201. Trained about the sprockets 201 and extending rearwardly about the sprockets 196 are two endless chains 202. (See Figures 17 to 21 inclusive.)

The endless chains 202 are made up of a series of links 203 which are connected by suitable pins 204. The chain links 203 are preferably provided with rectangular sockets 205 which are adapted to receive rubber blocks 206. The outer edge surrounding the rectangular socket 205 is pressed inwardly as shown at 207 and is adapted to grip and engage the rubber block 206 for securing and retaining the block within each link.

The rubber block is provided with a plurality of bristles 208. These bristles 208 are adapted to run closely together in close proximity to the ground to effectively lift the pods and stalks laying prostrate on the ground.

Operation of the bean harvester.

In the above description of my improved bean harvester, I have described the stalk pulling mechanism as an integral part of my machine, but it will of course be understood that under very favorable conditions on which the stalks are normally standing in fairly good shape that the conveyor disk 90 and chain 95 may perform the function of pulling the stalks from the ground without the necessity of having the special form of bean pulling mechanism previously described under that heading.

When the bean stalk pulling mechanism as well as the stalk lifting mechanism is used as an attachment, the arrangement is as shown in Figure 1.

The harvester is propelled down the row of stalks so that the machine passes over the row with the lower periphery of the revolving disk travelling at a tangent with the row of stalks. When the machine is operating along the row in this manner, the stalks are engaged adjacent the ground between the rubber rimmed disk 90 and the endless chain 95 and as the disk is revolved the stalks will be gradually lifted out of the ground and elevated and conveyed to a position where the revolving picker heads begin to comb the top of the stalks. These picker heads gradually work down until the complete stalk is combed and the pods removed by the picker fingers of the picker heads and by reason of the angular position of the axis of rotation of the picker arms with respect to the axis of rotation of the elevating conveying disks 90, it will readily be seen (by referring to Figure 2), that the picker heads begin to comb the stalks being elevated by the disk and conveyor chain beginning from the top and working on to the bottom of the stalks.

It will also be noted that by reason of the revolving picker arms being rotated at a faster speed than the revolving disk the revolving picker heads are always changing their position with respect to the stalks insuring complete combing of all of the stalks as they are being conveyed by the disk and conveyor chain.

As the pods are removed from the stalk they drop onto the inclined disk or drop onto the guards or shields 175 and 184 which in turn deflect them onto the endless conveyor belt 176. This endless conveyor belt conveys the pods rearwardly into a suitable receptacle secured at the rear of the machine. The stalks after the pods have been picked are conveyed forwardly and are dropped to the ground at the forward end of the revolving disk.

Under certain conditions it may be found necessary to mount the stalk pulling mechanism in advance of the lower edge of the revolving disk 90 and adjacent the inner edge guiding wheel 112 so that the inner laps of the puller chain are in alignment with the conveyor chain 95 as it comes in contact with the rotating disk 90 at which point the stalks are transferred from the bean puller to the elevating conveyor disk and chain.

It will of course be understood that the rear end of the stalk pulling mechanism is elevated or inclined with respect to its forward end (as clearly shown in Figure 2) so that the stalks are entirely withdrawn from the ground as they are transferred from the puller onto the elevating conveyor disk.

Under extreme conditions where the stalks are lying substantially prostrate on the ground I find it convenient to employ the stalk lifting or pod lifting mechanism in advance of the stalk pulling mechanism.

This stalk lifting or pod lifting mechanism is preferably mounted on the forward end of the stalk pulling mechanism and like the stalk pulling mechanism the rear end of the lifting mechanism is raised so as to maintain the stalk lifting mechanism in an inclined position whereby the stalks or pods are lifted so that the stalks can be readily gripped by the stalk lifting mechanism for pulling the stalks out of the ground.

In Figure 24, I have shown a modified form of a pod pulling mechanism which comprises the same type of picker head shown in Figure 11 which employs the same cams and spiders shown in Figures 12 and 14 inclusive with the exception that in substitution for the picker fingers shown in Figures 11 and 14, I have provided spring fingers 209 which are secured to the regular finger shafts 164 mounted on the spring fingers and extending transversely across the free ends thereof are rubber strips 210.

These rubber strips extend around and embrace the free end of the rubber fingers. As the fingers revolve on the opposite heads, the corresponding rows of fingers on the opposite heads are adapted to impinge and comb the stalks between the rubber strips and thereby remove the pods from the stalks in the manner clearly shown in Figure 24.

It will be noted that Figures 17, 18, and 19, although showing the same general type of lifting mechanism nevertheless differ to some slight extent. The details of construction shown on Figure 19 have been described but in Figures 17 and 18 I show a modification in which one of the shafts, upon which one of the sprockets 70 of the stalk pulling mechanism is mounted, is extended upwardly through the frame 57 thereof, and one of the sprockets 96 of the stalk lifting mechanism is keyed to the extension on this shaft.

Any usual means is provided for transmitting this motion to the other sprocket gear in order to obtain a uniform drive of both endless chains of the stalk lifter. In either case the frame members 200 of the stalk lifter are provided with an upwardly turned front portion to avoid the possibility of this portion of the mechanism digging into the ground or being deformed and broken by coming in contact with obstructions on the ground.

The particular arrangement of stalk lifter shown in Figures 17 and 18 is of great utility for mounting ahead of the stalk puller as shown very clearly in these figures. The particular construction of the frame and driving portions as shown in Figure 19, however, can be utilized in a different manner. It will be seen that the arched frame 185 shown in this figure is similar in appearance to the arched frame 60 of the stalk puller. This has been designedly arranged in order to make possible the removal of the stalk puller mechanism and the addition of the modified form of stalk lifter directly ahead of the elevating mechanism. When this is done the stalk lifter elevates the entire plant so that the pods will not be injured by the disk 90 or its associated chain 95. The elevator would then perform the function of pulling the bean stalks from the ground.

It will be seen by the description of the modification in the preceding paragraphs that provision is made whereby my bean harvester can be used under almost any possible condition. Sometimes the ground is hard and sometimes soft and the manner in which the stalks will be pulled from the ground will vary. Where the stalks are readily removed and standing in an upright position no separate pulling mechanism should be necessary and the machine can be used without any of the attachments. If the plants will pull readily from the ground but are lying somewhat prostrate the lifter can be employed without the stalk puller.

If the plants are not readily removable from the ground the stalk puller is preferably used and when in addition thereto the plants are lying prostrate, or the ground is uneven or in fact when any other unusual circumstances are encountered, both the lifter and stalk puller can be used to great advantage. Continued use of the harvester will soon make the operator familiar with exactly the best portions of the equipment to use in any particular case.

While in the above specification I have described one embodiment which my invention may assume in practice, it will of course be understood that the same is capable of modification and that modification may be made without departing from the spirit and scope of my invention as expressed in the following claims.

What I claim as my invention and desire to secure by Letters Patent is:—

1. A bean harvester comprising a frame, an inclined rotary disk mounted on said frame having one edge of its periphery in close proximity to the ground, a chain trained about the periphery of said disk whereby the stalks are impinged between the periphery of said disk and said chain for pulling, elevating and conveying said stalks, a picking mechanism mounted on said frame including a rotary shaft mounted at an angle with respect to the axis of rotation of said disk, a plurality of picker arms operably mounted on said shaft and rotatably driven thereby, a plurality of oppositely positioned picker heads mounted on the outer end of said picker arms, and a plurality of picker fingers mounted for rotation on said picker heads whereby the oppositely disposed picker heads pass on the opposite sides of said stalks as they are being conveyed by said disk and chain for removing the pods therefrom.

2. A bean harvester comprising a frame, a plurality of rollers mounted on said frame, an inclined rotary disk mounted on said rollers whereby a portion of the periphery of said disk lies in close proximity to the ground, a chain trained about a portion of the periphery of said disk for pulling elevating and conveying the stalks impinged between the periphery of said disk and chain, revolving picker arms mounted on said frame having their axis of rotation at an angle with respect to the axis of rotation of said disk, a plurality of picker heads mounted in the outer end of said picker arms, said picker arms being driven at a relatively greater speed than said rotary disk, and a plurality of revolving picker fingers mounted in said rotary picker heads whereby said picker fingers comb the bean stalks beginning from the top of the stalks and combing down through the stalks to a point adjacent the said disk and chain.

3. A bean harvester comprising a main frame, a secondary frame pivoted to said main frame, a plurality of rollers journalled on said secondary frame, a revolving disk mounted on said rollers, an endless chain trained about a portion of the periphery of said disk for impinging the stalks between the chain and the periphery of said disk whereby the stalks are pulled from the ground and elevated and conveyed, a plurality of picker arms mounted on said main frame and adapted to rotate on an axis at an angle with respect to the axis of rotation of said disk, a plurality of oppositely disposed rotatable picker heads mounted on the outer end of said arms, and a plurality of picker fingers mounted on an eccentrically controlled shaft carried by said picker heads for picking the bean pods from the stalks as they are being conveyed by said disk and chain.

4. A bean harvester comprising a main frame, a secondary frame pivoted to said main frame, a plurality of rollers journalled on said secondary frame, a revolving disk mounted on said rollers, an endless chain trained about a portion of the periphery of said disk for impinging the stalks between the chain and the periphery of said disk whereby the stalks are pulled from the ground and elevated and conveyed, a plurality of picker arms mounted on said main frame and adapted to rotate on an axis at an angle with respect to the axis of rotation of said disk, a plurality of oppositely disposed rotatable picker heads mounted on the outer end of said arms, and a plurality of cooperating picker fingers adapted to operate in pairs and mounted on eccentrically controlled shafts in said picker heads for combing the bean stalks as they are being elevated and conveyed by said disk and chain.

5. A bean harvester comprising a frame, a rotatable disk mounted on said frame, resilient material extending around the periphery of said disk, and an endless chain trained about a portion of the periphery of said disk and in contact with said resilient material, one portion of the periphery of said disk lying in close proximity to the ground whereby the bean stalks are gripped between the resilient material on the periphery of said disk and said chain and pulled from the ground as the disk is revolved about its axis of rotation.

6. A bean harvester comprising a frame, an inclined rotatable disk mounted on said frame, a resilient material extending around the periphery of said disk and an endless chain trained about a portion of the periphery of said disk and in contact with said resilient material, one portion of the periphery of said disk and said chain lying in close proximity to the ground whereby the bean stalks are gripped between the resilient material on the periphery of said disk and said chain and pulled from the ground as the disk is revolved about its axis of rotation.

7. A bean harvester comprising a frame, an inclined rotatable disk mounted on said frame, resilient material extending around the periphery of said disk, an endless chain trained about a portion of the periphery of said disk and in contact with said resilient material, one portion of the periphery of said disk and said chain lying in close proximity to the ground whereby the bean stalks are gripped between the resilient material on the periphery of said disk and said chain and pulled from the ground as said disk is revolved about its axis of rotation, and a plurality of revolving picker heads mounted on said frame and adapted to cooperate with said disk whereby said picker heads pick the pods from the bean stalks as they are held between the periphery of said disk and said chain.

8. A bean harvester comprising a main frame, a secondary frame pivoted to said main frame, a rotatable disk mounted on said secondary frame, a resilient material extending around the periphery of said disk and an endless chain trained about a portion of the periphery of said disk and in contact with said resilient material, one portion of the periphery of said disk and said chain lying in close proximity to the ground whereby the bean stalks are gripped between the resilient material on the periphery of said disk and said chain and pulled from the ground as said disk is revolved about its axis of rotation.

9. A bean harvester comprising a frame, an inclined rotatable disk mounted on said frame, an endless belt trained about a portion of the periphery of said disk, a portion of the periphery of said disk and belt lying in close proximity to the ground for elevating and conveying the bean stalks grasped between the periphery of said disk and belt, and a stalk pulling mechanism positioned in advance of that portion of the periphery of the disk and belt lying in close proximity to the ground for pulling the stalks from the ground and conveying them to said disk and belt.

10. A bean harvester comprising a frame, an inclined rotatable disk mounted on said frame, an endless belt trained about a portion of the periphery of said disk, a portion of the periphery of said disk and belt lying in close proximity to the ground for elevating and conveying the bean stalks gripped between the periphery of said disk and belt, and a stalk pulling mechanism comprising two oppositely disposed endless belts positioned in advance of that portion of said disk and belt lying in close proximity to the ground for pulling the stalks from the ground and conveying them to said disk and belt.

11. A bean harvester comprising a frame, an inclined rotatable disk mounted on said frame, an endless belt trained about a portion of the periphery of said disk, a portion of the periphery of said disk and belt lying in close proximity to the ground for elevating and conveying the bean stalks gripped between the periphery of said disk and belt, and a stalk pulling mechanism mounted at an angle with respect to the horizontal and comprising two oppositely disposed endless belts for engaging the opposite sides of a row of beans and for pulling the stalks from the ground and conveying them to said disk and belt.

12. A bean harvester comprising a frame, an inclined rotatable disk mounted on said frame, an endless belt trained about a portion of the periphery of said disk, a portion of the periphery of said disk and chain lying in close proximity to the ground for elevating and conveying the bean stalks gripped between the periphery of said disk and belt, and a stalk pulling mechanism mounted on said frame at an angle with respect to the horizontal and comprising two oppositely disposed endless belts having resilient material for gripping the stalks and pulling them from the ground and conveying them to said disk and belt.

13. A bean harvester comprising a frame, an inclined rotatable disk mounted on said frame, an endless belt trained about a portion of the periphery of said disk, a portion of the periphery of said disk and chain lying in close proximity to the ground for elevating and conveying the bean stalks gripped between the periphery of said disk and belt, a stalk pulling mechanism positioned in advance of that portion of the periphery of the disk and chain lying in close proximity to the ground for pulling the stalks from the ground and conveying them to said disk and belt, and a pod lifting mechanism comprising two oppositely disposed endless belts positioned on the opposite sides of the row of beans to be picked and operably supported by and in advance of the bean pulling mechanism.

14. A bean harvester comprising a frame, an inclined rotatable disk mounted on said frame, an endless belt trained about a portion of the periphery of said disk, a portion of the periphery of said disk and chain lying in close proximity to the ground for elevating and conveying the bean stalks gripped between the periphery of said disk and chain, a stalk pulling mechanism positioned in advance of that portion of the periphery of the disk and belt lying in close proximity to the ground for pulling the stalks from the ground and conveying them to said disk and belt, and a pod lifting mechanism positioned at an angle with respect to the horizontal and supported in advance of said bean pulling mechanism, said pod lifting mechanism comprising two oppositely disposed endless chains having bristles secured to each of the links of said chain whereby said bristles engage the bean pods and lift them in a manner to permit said bean pulling mechanism to engage the stalks for pulling the stalks out of the ground.

15. A bean harvester comprising a frame, rotating disk mounted on said frame, a chain operably connected with said disk for conveying and elevating bean stalks, a pod picking mechanism mounted on said frame and operably related to said disk and chain for picking the pods from the stalks held by said disk and chain, a stalk pulling mechanism positioned adjacent one portion of the periphery of said disk and extending forwardly therefrom, and a pod lifting mechanism secured to said lifting mechanism and positioned in advance of the same for lifting the bean pods whereby the stalk pulling mechanism may engage the stalks for pulling the same out of the ground.

16. A bean harvester comprising a frame, a stalk pulling and elevating and conveying mechanism mounted on said frame, said stalk pulling, elevating and conveying mechanism being arranged to maintain said stalks in a substantially vertical position as they are being conveyed, and a pod picking mechanism mounted on said frame and operably related to said bean pulling, elevating and conveying means whereby the pods are picked from said stalks while they are held in a vertical position in said stalk pulling, elevating and conveying mechanism.

17. A bean harvester comprising means for pulling bean stalks, said means comprising flexible gripping members adapted to impinge the opposite side of said bean stalks.

18. In a bean harvester, means for pulling bean stalks comprising a chain having cushioned links gripping the bean stalks.

19. In a bean harvester, means for pulling bean stalks comprising links, and cushion members in said links.

20. In a bean harvester, means for pulling beans comprising a plurality of cushioned members arranged in an endless chain.

21. In a bean harvester, means for pulling and conveying bean stalks comprising two series of compressible members, said series of links being adapted to be moved toward and away from one another to grip and to release bean stalks.

22. In a bean harvester, a stalk gripping and lifting element of opposed members having parallel paths of travel and comprising compressible portions adapted to be freely distorted about such stalks.

23. A bean harvester comprising a frame, a chain and disk for pulling, elevating and conveying said stalks, a picking mechanism mounted on said frame including a rotary shaft mounted at an angle with respect to the axis of rotation of said disk, a plurality of picker arms operably mounted on said shaft and rotatably driven thereby, a plurality of oppositely positioned picker heads mounted on the outer end of said picker arms, and a plurality of picker fingers mounted for rotation on said picker heads whereby the oppositely disposed picker heads pass on the opposite sides of said stalks as they are being conveyed by said disk and chain for removing the pods therefrom.

24. A bean harvester comprising a frame, a chain and disk for pulling, elevating, and conveying the stalks impinged between the periphery of said disk and chain, picker arms mounted on said frame having their axis of rotation at an angle with respect to the axis of rotation of said disk, a plurality of picker heads mounted in the outer end of said picker arms, said picker arms being driven at a relatively greater speed than said rotary disk, and a plurality of revolving picker fingers mounted in said rotary picker heads whereby said picker fingers comb the bean stalks from the top thereof to a point adjacent said disk and chain.

25. A bean harvester comprising a frame, a plurality of rollers, a revolving disk mounted on said rollers, an endless chain trained about a portion of the periphery of said disk for impinging the stalks between the chain and the periphery of said disk, a plurality of picker arms mounted on said frame and adapted to rotate on an axis at an angle with respect to the axis of rotation of said disk, a plurality of oppositely disposed picker heads mounted on the outer end of said arms, an eccentrically controlled shaft on said picker heads, and a plurality of picker fingers mounted on said eccentrically controlled shaft for picking the bean pods from the stalks as they are being held by said disk and chain.

26. A bean harvester comprising a frame, a rotatable disk mounted on said frame and having a resilient material extending around the periphery thereof, and an endless chain trained about a portion of the periphery of said disk and in contact with said resilient material, one portion of the periphery of said disk lying in close proximity to the ground whereby the bean stalks are gripped between the resilient material on the periphery of said disk and said chain and pulled from the ground as said disk is revolved.

27. A bean harvester comprising a frame, a rotatable disk mounted on said frame and having a resilient material extending about the periphery thereof, an endless chain trained about a portion of the periphery of said disk and in contact with said resilient material, one portion of the periphery of said disk and said chain lying in close proximity to the ground to grip the bean stalks, said stalks being gripped between said disk and said chain and pulled from the ground as said disk is revolved, and a plurality of revolving picker heads mounted on said frame and adapted to pick the pods from the bean stalks as they are held between the periphery of said disk and said chain.

28. A bean harvester comprising a frame, means for elevating and conveying bean stalks, and a stalk pulling mechanism comprising opposed endless belts in advance of said elevating and conveying means and in close proximity to the ground for pulling the stalks from the ground and conveying them to said elevating and conveying means.

29. A bean harvester comprising a frame, a disk mounted on said frame, an endless belt trained about a portion of the periphery of said disk for elevating and conveying bean stalks gripped between the periphery of said disk and said chain, and a stalk pulling mechanism comprising endless belts at opposite sides of a row of beans for pulling the stalks from the ground and for conveying them to said disk and chain.

30. A bean harvester comprising a means for pulling bean stalks, and a holding and conveying means for gripping the bean stalks in close proximity and beneath said pulling means.

31. A bean harvester comprising pulling means gripping bean stalks at a predetermined point above ground, and conveying means for gripping said stalks beneath the point of contact of said pulling means.

32. A bean harvester comprising a pulling means for elevating bean stalks from the ground, and a conveying means therefor gripping said stalks at a point nearer the roots thereof than gripped by said pulling means.

WILLIAM E. URSCHEL.